(12) United States Patent
Fütterer

(10) Patent No.: US 6,676,558 B2
(45) Date of Patent: Jan. 13, 2004

(54) PLANET GEAR

(75) Inventor: Bodo Fütterer, Lucerne (CH)

(73) Assignee: Maxon Motor GmbH, Sexau (DE)

( * ) Notice: Subject to any disclaimer, the term of this patent is extended or adjusted under 35 U.S.C. 154(b) by 0 days.

(21) Appl. No.: 10/084,360

(22) Filed: Feb. 28, 2002

(65) Prior Publication Data

US 2002/0151405 A1 Oct. 17, 2002

(30) Foreign Application Priority Data

Mar. 2, 2001 (DE) .......................................... 101 10 282

(51) Int. Cl.⁷ ................................................. F16H 57/12
(52) U.S. Cl. ........................ 475/346; 475/331; 74/409
(58) Field of Search ............................ 74/409; 475/331, 475/346, 347

(56) References Cited

U.S. PATENT DOCUMENTS 5,240,462 A * 8/1993 Mochizuki et al. ......... 475/342
5,409,430 A * 4/1995 Hashimoto et al. ......... 475/331
5,593,360 A * 1/1997 Ishida et al. ................ 475/331
5,779,589 A 7/1998 Fütterer

FOREIGN PATENT DOCUMENTS

| DE | 37 38 607 A1 | 5/1989 |
| DE | 195 46 586 A1 | 6/1997 |
| EP | 0 779 449 A2 | 6/1997 |

* cited by examiner

*Primary Examiner*—Ankun Parekh
(74) *Attorney, Agent, or Firm*—Burns, Doane, Swecker & Mathis, L.L.P.

(57) ABSTRACT

The invention relates to a planet gear having a planet carrier rotatable around an axis of rotation, comprising at least one planet wheel arranged on the planet carrier, a sun wheel and a ring gear, wherein the planet wheel is arranged in a movable manner at least radially with respect to the axis of rotation of the planet carrier. To minimize the backlash of a planet gear of this type, it is further provided that the ring gear is formed in two pieces on a plane perpendicular to the axis of rotation of the planet carrier, wherein the two halves of the ring gears can be rotated against each other and thereby effect a radial shift of the planet wheel in the direction towards the sun wheel in order to reduce backlash.

12 Claims, 6 Drawing Sheets

PLANET GEAR

CROSS REFERENCE TO RELATED APPLICATIONS

Figure 1:
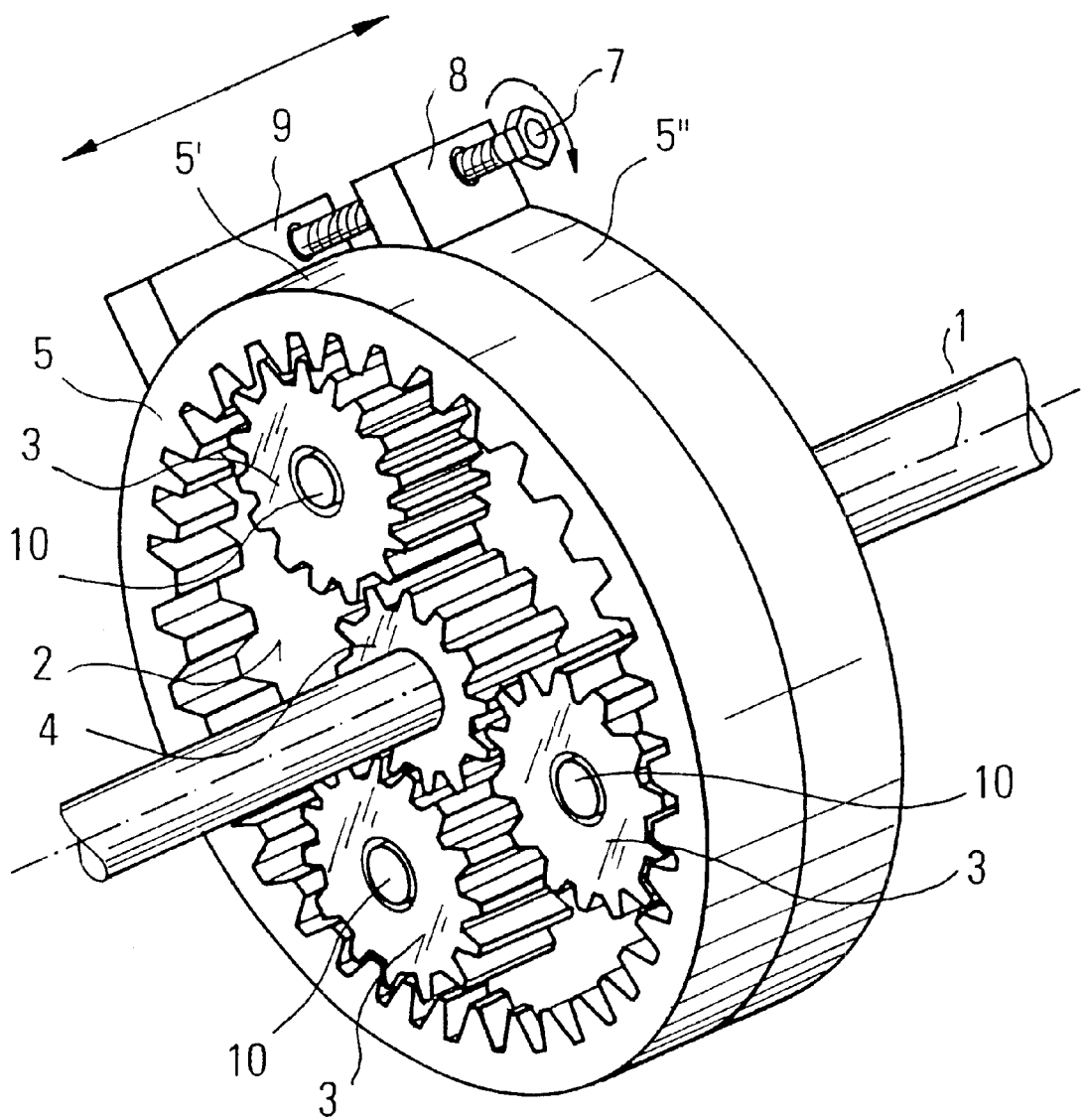

This application is a continuation of Application No. 101 10 282.8 filed in Germany on Mar. 2, 2001, to which this application claims priority under 35 U.S.C. §119 and/or 365.

RELATED ART

The present invention relates to a planet gear comprising a planet carrier rotatable around an axis of rotation, at least one planet wheel arranged on the planet carrier, a sun wheel and a ring gear, wherein the planet wheel is arranged movably at least radially with respect to the axis of rotation of the planet carrier.

SUMMARY

A planet gear of this type is known from DE 195 46 586 and from EP 0 779 449. The radial movability of the planet wheels with respect to the planet carrier effects in the known planet gear a significant increase of the life, which is obviously a result of the fact that static over definitions are avoided. However, it proved that the demands on the planet gear are not only the demand for a longer life but also that freedom from backlash is increasingly required in particular for certain applications Thus, it is the object of the present invention to design a planet gear of the above-mentioned kind in a manner that as little backlash as possible occurs.

For this purpose, the invention provides that the ring gear is formed in two pieces on a plane perpendicular to the axis of rotation of the planet carrier, wherein the two halves of the ring gear can be rotated against each other and thereby effect a radial shift of the planet wheel in the direction towards the sun wheel in order to reduce backlash.

Planet gears with divided ring gears are known per se. For this purpose, reference is for instance made to DE 37 38 607 A1. The multi-step planet gear that is known there also has divided planet wheel besides having a divided ring gear. By rotating the halves of the ring gear against each other by means of adjusting screws, the two planet wheels are positioned against each other so that a possible backlash between the ring gear and the planet wheels is avoided. However, the disadvantage thereof is that in one direction of rotation only one half of the tooth flanks of the sun wheel perform the carrying work. If it is intended to transfer the same power by this gear as transferred by a conventional planet gear, the axial overall length of the gear is compulsorily increased. In contrast thereto, the gear according to the present invention provides that only the ring gear is divided but not the planet wheels. Instead, the planet wheels are supported in a radially movable manner so that when rotating the ring gear halves, not only the backlash between the planet wheel and the ring wheel is reduced, but the backlash between the sun wheel and the planet wheel is also reduced due to the radial shift in the direction towards the sun wheel. It is advantageous that the tooth flanks of the sun wheel carry across the sun wheel's entire axial length so that despite the reduction of backlash, the overall dimensions of the planet gear do not have to be changed.

According to an embodiment of the invention, the two ring gear halves can be fixed against each other. This may for instance be carried out in that the one half of the ring gear is fixed in the housing, whereas the other half of the ring gear can be rotated by means of an adjusting screw against the fixed half of the ring gear until the desired freedom from backlash is achieved.

Another embodiment provides that the two ring gear halves are spring-elastically positioned against each other in the tangential direction. For this purpose, the one half of the ring gear may again be fixed in the housing, whereas the other half of the ring gear is arranged rotatably with respect to the fixed half of the ring gear, and this other half of the ring gear is supported by a spring supported at the housing. The strength of the spring will be chosen in accordance with the dimensions of the gear and the torques to be transferred.

An especially preferred embodiment provides a combination of a spring-elastic pre-positioning of the two halves of the ring gears and their subsequent relative fixing. For this embodiment, the springs positioning the two halves of the ring gear against each other are merely required for a freedom from backlash being produced e.g. during idle running or in the case of a very small load. Then, the two halves of the ring gear are fixedly positioned against each other, e.g. by means of a screw, so that the springs do not have to transfer a torque.

According to a preferred embodiment, the two halves of the ring gear may be connected to one another through a train of gears in a manner that an axial movement of an element of the train of gears effects a rotation of the two halves of the ring gear against each other. Such a train of gears, which may for instance be a tapered gear, would have the advantage that the freedom from backlash could be adjusted from a front side of the gear. This is in particular of advantage if in the installed condition of the gear the backlash must be re-adjusted and the radial accessibility of the gear is not ensured.

An especially simple train of gears can be realized if at least one of the two halves of the ring gear is axially movable with respect to the other half of the ring gear. Then, the axially movable half of the ring gear may be connected via a tapered gear with the axially and tangentially fixed half of the ring gear so that an axial shift of the movable half of the ring gear effects a mutual rotation of the two halves of the ring gear.

Such a coupling of the halves of the ring gear via a train of gear is particularly advantageous if the trains of gear of the halves of the ring gear of several gear steps are connected to one another. Then, all gear steps of the planet gear can be adjusted in a manner free from backlash by one single operation of the train of gears.

A preferred embodiment of the invention provides that the two halves of the ring gear of the planet gear can be positioned in the axial direction, wherein the two halves of the ring gear are connected to one another in the tangential direction via a spring, which effects a mutual rotation of the two halves of the ring gear in the axial non-positioned condition of the two halves of the ring gear. As mentioned above, the strength of the springs is chosen in a manner that after releasing the fastening screws, the two halves of the ring gears rotate against each other so that the planets are shifted radially until a compensation of backlash is obtained. After reaching this backlash compensation, the axial fastening screws are fastened so that the two halves of the ring gear can be fixed against each other. In this state free from backlash, the springs do not transfer a load. The strength of the springs must therefore not be adapted to the torque to be transferred by the gear.

A solution especially easy to realize provides that the halves of the rings gear are connected to one another via at least one fastening screw arranged on a parallel axis of rotation which penetrates the halves of the ring gear, wherein in at least one half of the ring gear the bore for the screw has backlash in the tangential direction of the ring gear in a manner that the half of the ring gear may move tangentially with respect to the screw. That means that the screw can be fixed tangentially in one half of the ring gear, wherein the other half of the ring gear has a bore with a tangential backlash so that the two halves of the ring gear can be slightly rotated against each other. Since the backlash to be eliminated in the gear is usually not very grerat, a relatively small difference in dimension between the bore and the outer diameter of the fastening screw is sufficient.

In a structurally particularly simple manner, the spring provided for the rotation of the halves of the ring gear against each other can be arranged, in which a recess opening into the bore for accommodating a pressure spring is provided in the movable half of the ring gear, said pressure spring being radially supported against the screw.

In a multi-step planet gear it is favourable if all halves of the ring gear are penetrated by the fastening screw.

In particular when higher torques are to be transferred by the gear, it is also of advantage if at least two diametrally opposing fastening screws are arranged.

BRIEF DESCRIPTION OF THE DRAWING FIGURES

It is favourable for a simple installation and for a simple manufacture of the ring gear if the halves of the ring gear each have centering recesses, into which adjoining halves of the ring gear engage with a centering collar. The individual halves of the ring gear of the respective steps can be stacked in a tower-like manner, wherein the only degree of freedom that remains is a rotation of the steps in the tangential direction, namely the degree of freedom that is required for adjusting the degree of freedom of the gear.

The embodiments of the invention will now be explained by means of a drawing.

Figure 2:
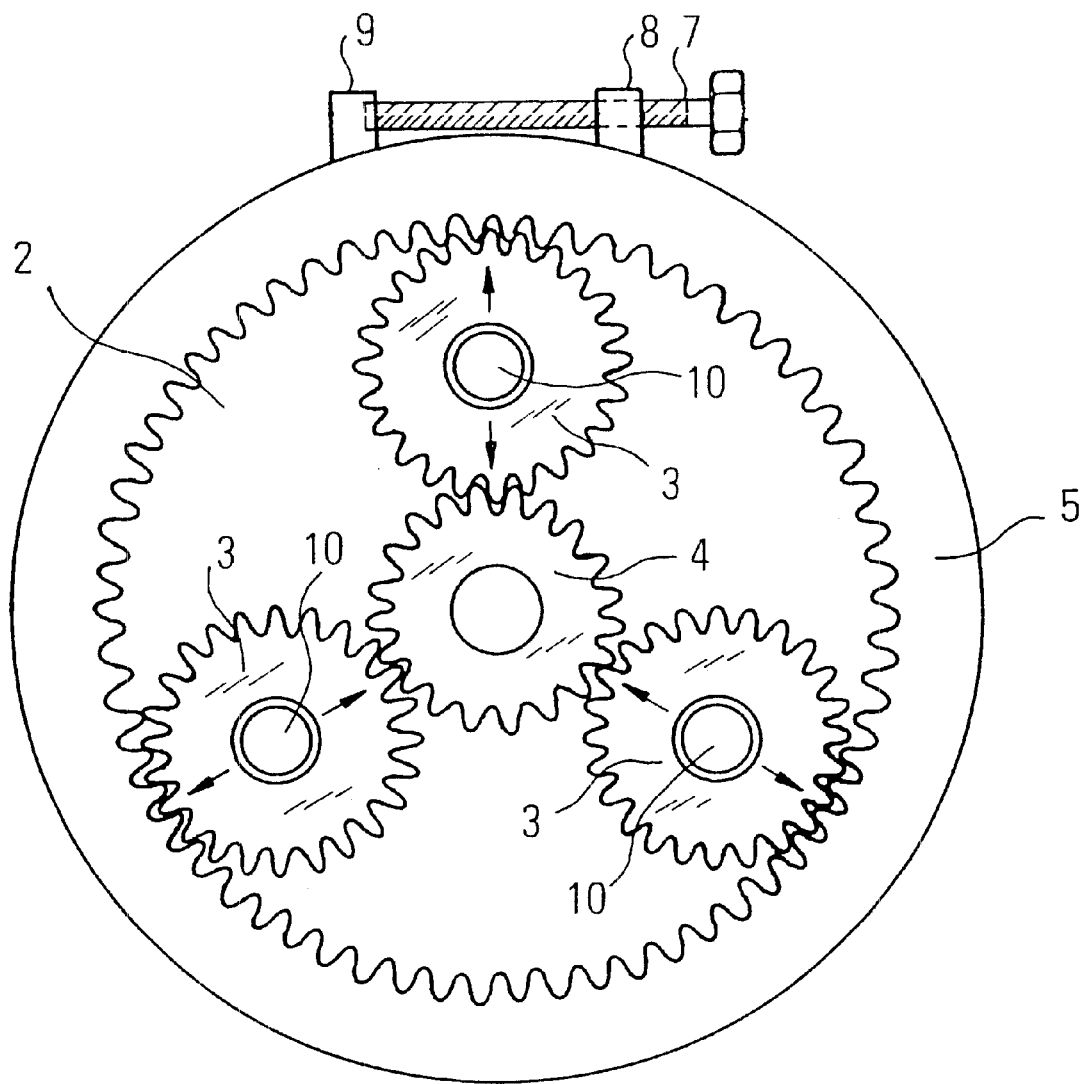
Figure 3:
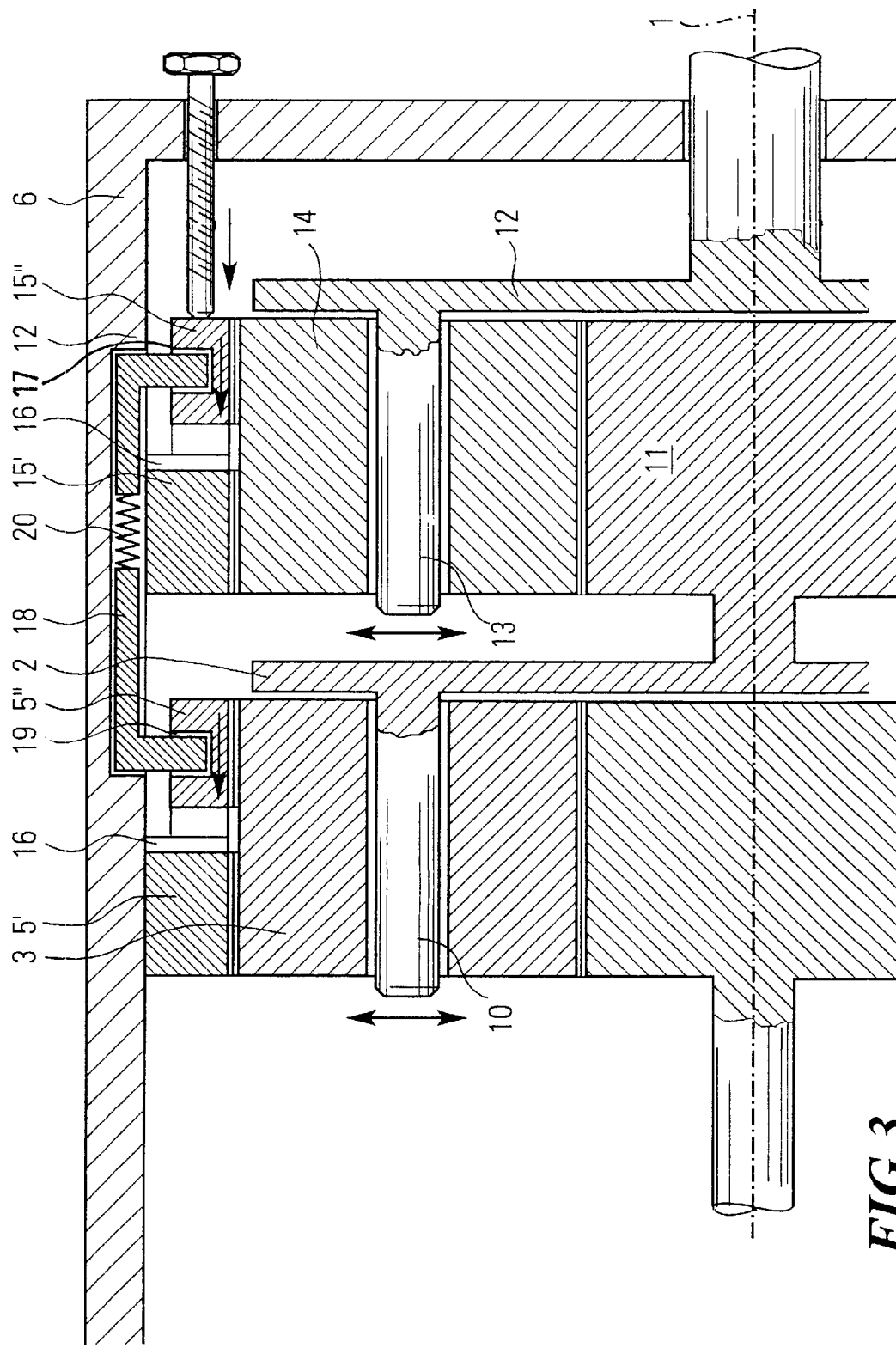
Figure 4:
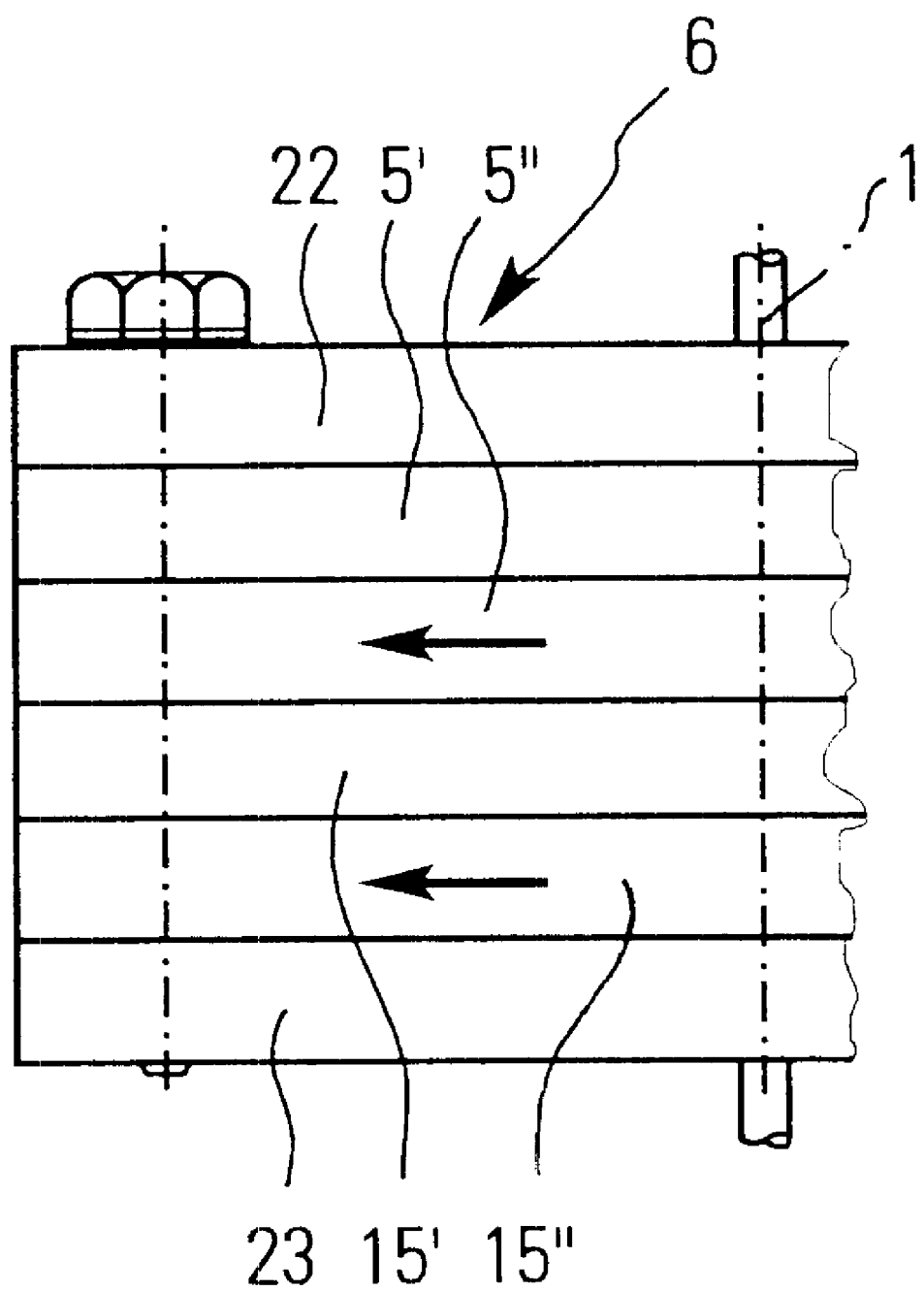
Figure 5:
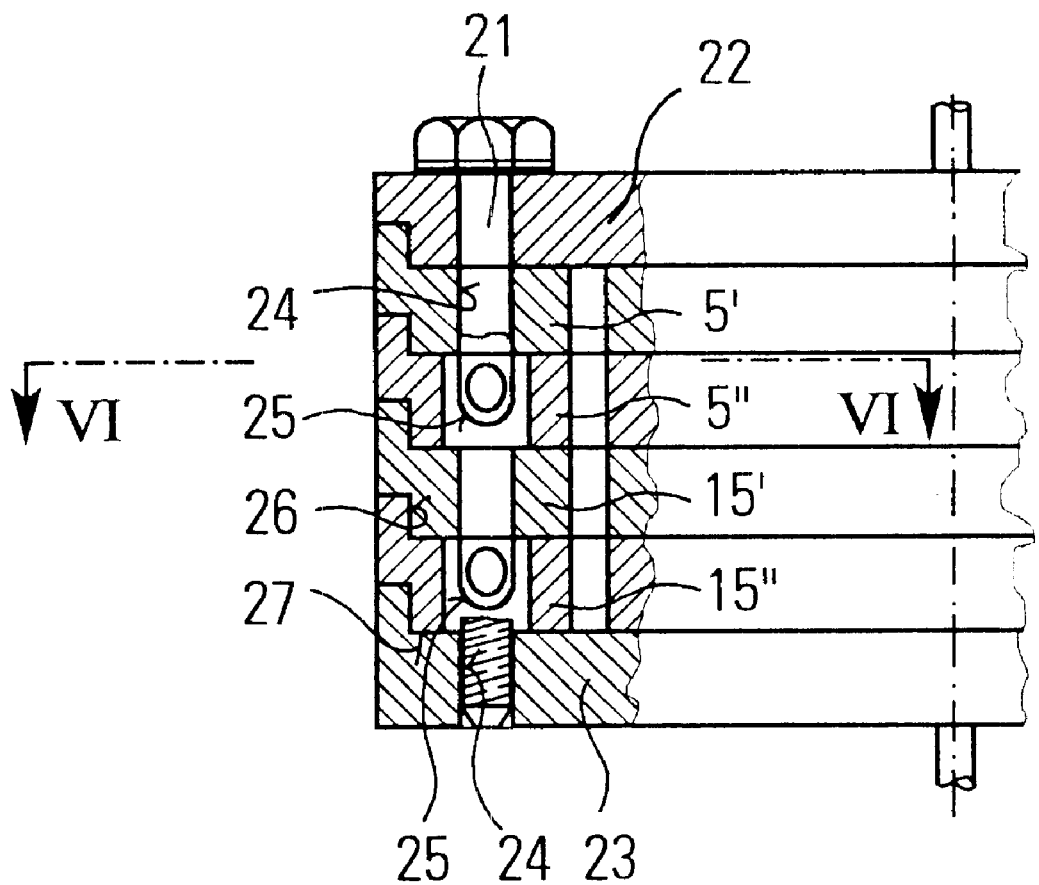
Figure 6:
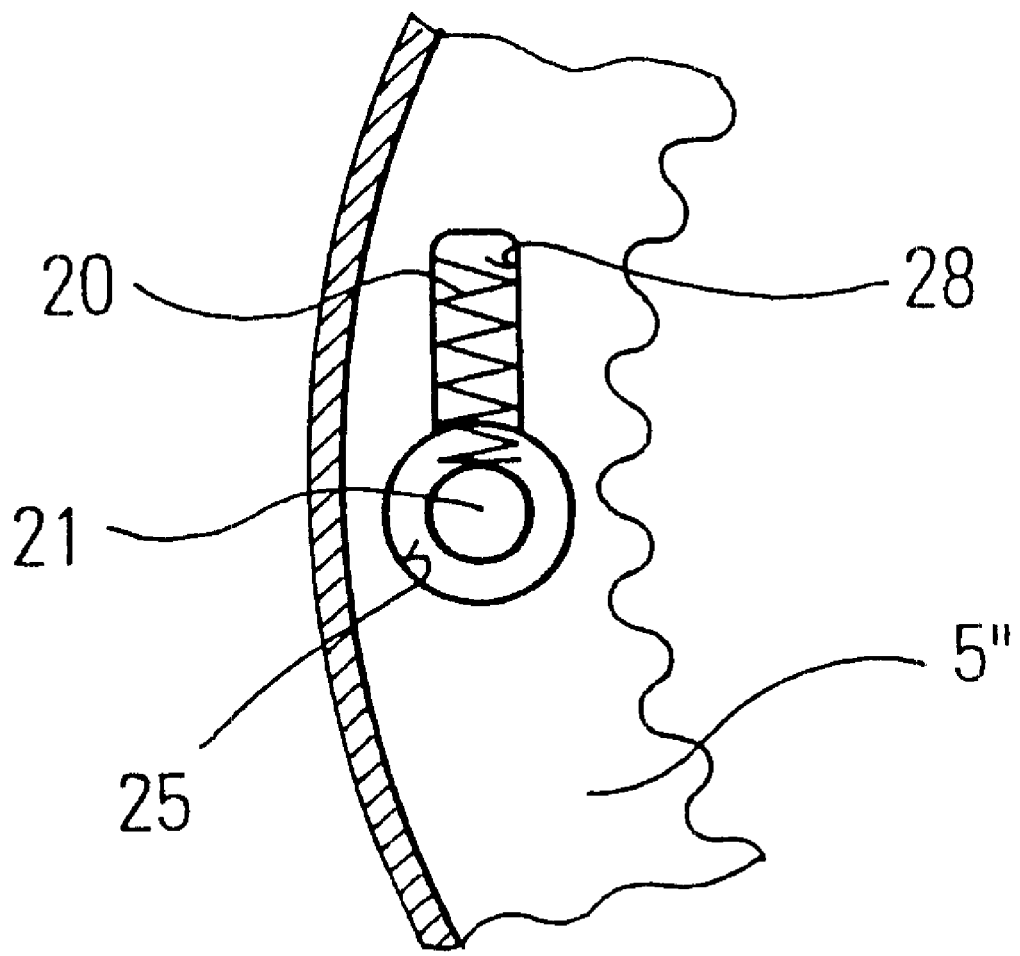

FIG. 1 shows a perspective, diagrammatic view of a planet gear according to the invention, FIG. 2 shows the planet gear of FIG. 1 in a diagrammatic front view, FIG. 3 shows a diagrammatic sectional view of a multi-step planet gear according to an embodiment of the invention, FIG. 4 shows a diagrammatic side elevation view of a planet gear of a further embodiment, FIG. 5 shows a sectional view through the embodiment according to FIG. 4, and FIG. 6 shows a sectional view through the gear according to FIG. 5 along line VI/VI.

DETAILED DESCRIPTION OF EMBODIMENTS

In the drawings, a planet gear with a planet carrier 2 rotating around a gear axle 1, planet wheels 3 and a sun wheel 4 is shown. The planet carrier 2 is encompassed by a ring gear 5 whose teeth mesh with the teeth of the planet wheels 3. The ring gear 5 is divided into two halves 5' and 5". The one half 5' is fixedly connected to the housing 6, whereas the other half 5" can be rotated against the first half. As may be seen from FIGS. 1 and 2, the rotatability is effected there by means of an adjusting screw 7, the thread thereof engaging on the one hand a pedestal 8 of the movable half 5" of the ring gear and the other end thereof being supported at a support block 9, which is connected to the fixed half 5' of the ring gear.

The planet wheels 3 are arranged on axle journals 10 of the planet carrier 2, at such a radial backlash that the planet wheels 3 are movable radially between the sun wheel 4 and the ring gear 5. This movability can in particular well be seen from FIG. 2. In order to achieve this movability, the axle journals 10, as shown in FIG. 2, are preferably formed ovally so that the planet wheels have a radial backlash, but not in the circumferential direction.

The function of the invention will now be explained.

By rotating the adjusting screw 7, the two halves 5' and 5" of the ring gear are rotated against each other. Thereby, the distance of the tooth flanks of the ring gear engaging the planet wheels is reduced. This reduction in distance leads on the one hand to the fact that the backlash between the teeth of the planet wheels and those of the ring gear 5 is reduced. As soon as this backlash has become zero because the tooth flanks contact each other on both sides, a further rotation of the halves 5' and 5" of the ring gear enforces a movement of the planet wheels 3 radially inwardly in the direction towards the sun wheel 4. This radial shift now effects that the tooth engagement between the planet wheels 3 and the sun wheel 4 becomes stronger until the backlash between the planet wheels 3 and the sun wheel 4 is minimized. As soon as this state is reached is the adjusting screw 7 no longer turned but fixed in this position, which can for instance be performed by means of a counter nut that is not shown in detail in this case or by other known measures. The planet gear that is now adjusted in a manner free from backlash is characterized by the fact that although the planet wheels are in tooth engagement with the ring gear only across half of the axial length of the tooth flanks, they are, however, in engagement at the full axial length to the sun wheel 4 where the highest loads occur.

This type of backlash reduction therefore enables the maintenance of a structural size as small as possible.

A further embodiment of the gear is now described by means of FIG. 3, with the example of a multi-step planet gear. For reasons of clarity reference is only made to the deviations compared to the above-described embodiment.

The multiple step design of the planet gear according to FIG. 3 is achieved in that the planet carrier carries a sun wheel 11 on its rear side, said sun wheel being formed integrally with the planet carrier 3. The second step further comprises a planet carrier 12 on whose axle journals 13 planet wheels 14 are supported in a radially movable and rotary manner. The planet wheels 14 are encompassed by a ring gear 15, which in turn is divided into two halves 15' and 15".

The halves 5' and 15' are fixedly connected to the housing 6, e.g. by means of a press seat or by other means ensuring a positive fit. The movable halves 5" and 15" are not only, as in the other embodiment, rotatable in the circumferential direction but also in the axial direction, which is indicated by the respective arrow. On the front faces confronting each other, the halves 5' (and 15') and 5" (and 15") of the ring gears have a radial toothing 16. This radial toothing 16 effects that the respective halves 5', 5" and 15', 15", respectively, are rotated against each other if the axially movable half 5" and 15", respectively, is axially moved towards the fixed half 5' and 15' of the ring gear. This axial movement of the displaceable half of the ring gear is achieved in the embodiment shown in FIG. 3 by means of an adjusting screw 7, which engages a thread located in the housing 6. The end facing away from the screw head is supported at the front side of the ring gear 15".

For a more regular power distribution, a plurality of such adjusting screws 7 may be provided around the circumference of the planet gear housing. For reasons of clarity, these adjusting screws are not shown.

A recess 17 is located on the outer side of the ring gear 15" with a coupling element 18 engaging into said recess. With its other end the coupling element 18 engages a recess 19 of the half 5" of the ring gear. The coupling element 18 is substantially rigid, however, it may comprise a spring 20 which enables the compensation of a certain amount of backlash.

The function of the embodiment according to FIG. 3 will now be explained in detail.

The frictional connection of the gear is performed in a known manner. The input shaft, which is not shown, drives the sun wheel 4. This sun wheel drives the planet carriers 3, which roll off at the ring gear 5 and therefore set the planet carrier 2 into rotation, whereupon in the second step the sun wheel 11, the planet carriers 14 and finally the planet carrier 12 are driven, wherein the latter is connected to the output shaft. In order to eliminate the backlash between the components ring gear, planet wheels and sun wheel, the ring gear halves 5, 5" and 15', 15", as in the above-described embodiment, are again rotated against each other. This rotation is performed in a manner that the adjusting screw 7 is screwed into the housing. Due to the support of the adjusting screw 7 on the front side of the ring gear 15 the ring gear half 15" is axially shifted to the left. In this condition do the tooth flanks of the radial toothing 16 of the respective ring gear halves 5', 5", and 15', 15", respectively contact each other. This axial shift of the ring gear half 15" therefore effects that the ring gear half 15" does not only move-axially but also rotates in the circumferential direction with respect to the ring gear half 15'. At the same time, the axial movement of the ring gear half 15" is transferred via the coupling element 18 onto the ring gear half 5". Thus, the ring gear half 5" is moved axially and due to the radial toothing 16 it is rotated in the circumferential direction against the ring gear half 5'. In this manner the backlash in each step of the multi-step planet gear can be minimized by one operation. Since it cannot be assumed that the backlash is identical in each step, a spring 20 may be provided in the coupling element 18, as shown in FIG. 3, which compensates for an over-load. Such a spring could also be integrated into the adjusting screw 7 itself in order to take a certain wear of the tooth flanks into consideration.

Although not shown, the multi-step gear could also comprise further steps that are coupled to one another in a similar manner.

FIGS. 4 and 6 show a further embodiment of the invention, in which only the differences to the preceding embodiment are described. As far as possible, the same reference numerals are used for the same components.

The basic difference to the above-described embodiment is that the individual ring gear halves 5', 5" are rotated against each other by means of a spring 20, but are then axially positioned with one another by means of a fastening screw 21.

The structure of this arrangement is especially well shown in FIG. 5. There, two ring gears 5 and 15 are provided, each have ring gear halves 5', 5", and 15', 15", respectively.

On their front side, the two ring gears 5 and 15 are covered by lids 22 and 23. The lids as well as the ring gears 5 and 15 are penetrated by an axial bore. The bores 24 in the halves 5' and 15' of the ring gears and the lids 22 and 23 basically almost precisely correspond to the diameter of the fastening screw 21, wherein a thread is also provided in the lid 23. The bores 25 in the halves 5" and 15" of the ring gear have a larger diameter so that these two halves of the ring gear can also be rotated against the other halves 5' and 15' of the ring gear when a fastening screw is screwed in, in case this screw is not fastened.

Furthermore, it can easily be seen from FIG. 5 that the lids 22 and 23 as well as the halves 5' to 15" of the ring gear each have a centering recess 26 and a centering collar 27, wherein the centering collar of the one half of the ring gear fits to the centering recess of the other half of the ring gear.

From FIG. 6 it can be seen that in a tangential alignment to the half 5" of the ring gear a recess 28 radially opening into the bore 25 is provided, into which the spring 20, formed as a pressure spring in this case, may be inserted. FIG. 6 shows that the spring 20 is supported on the bottom of the recess 28 and radially at the fastening screw 21.

The function of the embodiment according to FIGS. 4 to 6 will now be described in detail.

First of all, the entire ring gear of the planet gear is assembled in a manner that all teeth of the individual halves of the ring gear are in alignment. After assembling the individual planet carriers and planets, i.e. after full assembly of the planet gear, the fastening screws 21 are released so that the springs 20 may rotate the respective halves 5" and 15" of the ring gear with respect to the fixed halves 5' and 15" of the ring gears. This rotation effects, as also in the above-described embodiments, that the planets radially move inwardly, so that the backlash between the planets and the sun wheel on the one hand, and also of the ring gear and the planets on the other hand is minimized. This backlash compensation may be supported in that when the fastening screws are released, the gear shaft is rotated. After the backlash has minimized due to the effect of the pressure springs 20, the fastening screws 21 are fastened again so that the ring gear halves 5', 5" and 15', 15", respectively, are fixedly positioned against each other. The gear is now adjusted in a manner free from backlash. If due to wear of the gear during use backlash occurs again, this backlash, caused by wear, can be eliminated in the same manner as described above, in that the fastening screws are temporarily released and are then fastened again.

What is claimed is:

1. A planet gear comprising a planet carrier rotatable around an axis of rotation, at least one planet wheel arranged on the planet carrier, a sun wheel and a ring gear, wherein the planet wheel is arranged movably at least radially with respect to the axis of rotation of the planet carrier, wherein the ring gear is divided in two on a plane perpendicular to the axis of rotation of the planet carrier, wherein the two halves of the ring gear can be rotated against each other and effect a radial shift of the planet wheel in the direction towards the sun wheel to reduce backlash.

2. A planet gear as claimed in claim 1 wherein the two halves of the ring gear can be fixed against each other.

3. A planet gear as claimed in claim 1, wherein the two halves of the ring gear are positioned against each other in a spring-elastic manner in the tangential direction.

4. A planet gear as claimed in claim 1, wherein the two halves of the ring gear are connected to one another through a train of gears in a manner that an axial movement of an element of the train of gears effects a rotation of the two halves of the ring gear against each other.

5. A planet gear as claimed in claim 4, wherein at least one of the halves of the ring gear is axially movable against the other half of the ring gear.

6. A planet gear as claimed in claim 4, wherein the planet gear is formed with multiple steps and wherein the train of gears of the halves of the ring gears are connected to one another.

7. A planet gear as claimed in claim 1, wherein one of the two halves of the ring gear can be positioned in the axial direction with respect to another of the two halves, wherein the two halves of the ring gear are connected to one another in the tangential direction via a spring, which effects in an axially non-positioned condition of the two halves of the ring gear a rotation of the two halves of the ring gear.

8. A planet gear as claimed in claim 1, wherein the halves of the ring gear are connected to one another through at least one fastening screw arranged in parallel to the axis of rotation and axially penetrating the halves of the ring gear, wherein in at least one half of the ring gear the bore for the screw has backlash in the tangential direction of the ring gear, in a manner that the at least one half of the ring gear may move tangentially with respect to the fastening screw.

9. A planet gear as claimed in claim 1, wherein a recess opening into the bore for accommodating a pressure spring is provided in a movable half of the ring gear, said pressure spring being radially supported at the screw.

10. A planet gear as claimed in claim 1, wherein the planet gear is formed of multiple steps, each step comprising a ring gear with two halves, and all halves of the ring gear are penetrated by a fastening screw.

11. A planet gear as claimed in claim 8, wherein two fastening screws are arranged diametrally opposite.

12. A planet gear as claimed in claim 1, wherein the planet gear is formed of at least two steps, each step comprising a ring gear with two halves, wherein each step has a half which has a centering recess into which an adjoining half with a centering collar engages.

* * * * *